(12) United States Patent
Young et al.

(10) Patent No.: US 11,890,678 B2
(45) Date of Patent: Feb. 6, 2024

(54) SYSTEMS AND METHODS FOR ABRASIVE OXIDE REMOVAL IN ADDITIVE MANUFACTURING PROCESSES

(71) Applicant: Honeywell Federal Manufacturing & Technologies, LLC, Kansas City, MO (US)

(72) Inventors: Barbara D. Young, Raymore, MO (US); Jeffery J. Warger, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 66 days.

(21) Appl. No.: 17/509,330

(22) Filed: Oct. 25, 2021

(65) Prior Publication Data

US 2023/0129915 A1    Apr. 27, 2023

(51) Int. Cl.
| | |
|---|---|
| *B22F 10/66* | (2021.01) |
| *B33Y 10/00* | (2015.01) |
| *B33Y 40/20* | (2020.01) |
| *B33Y 50/02* | (2015.01) |
| *B22F 10/38* | (2021.01) |
| *B33Y 30/00* | (2015.01) |
| *B22F 10/22* | (2021.01) |

(52) U.S. Cl.
CPC ............. *B22F 10/66* (2021.01); *B22F 10/22* (2021.01); *B22F 10/38* (2021.01); *B33Y 10/00* (2014.12); *B33Y 30/00* (2014.12); *B33Y 40/20* (2020.01); *B33Y 50/02* (2014.12); *B22F 2998/10* (2013.01)

(58) Field of Classification Search
CPC .......... B22F 10/66; B22F 10/22; B33Y 40/20; B33Y 10/00; B33Y 30/00
See application file for complete search history.

(56) References Cited

U.S. PATENT DOCUMENTS

| | | | |
|---|---|---|---|
| 7,439,501 B2 | 10/2008 | King et al. | |
| 7,825,026 B2 | 11/2010 | Izumi et al. | |
| 10,303,840 B2 | 5/2019 | Yeric | |
| 2003/0214029 A1* | 11/2003 | Tao | H01L 23/10 |
| | | | 257/E21.705 |
| 2007/0104870 A1* | 5/2007 | Kodas | H05K 3/105 |
| | | | 427/256 |

FOREIGN PATENT DOCUMENTS

WO    WO-2017035442 A1 *  3/2017  ............. B23K 20/10

\* cited by examiner

*Primary Examiner* — Anthony M Liang
*Assistant Examiner* — Jacob J Gusewelle
(74) *Attorney, Agent, or Firm* — Erise IP, P.A.

(57) ABSTRACT

Systems and methods for removing an oxide layer in an additive manufacturing process are provided. A direct write machine may be used to create wire bonds for semiconductors. The direct write machine may deposit a conductive print material between bond pads to create interconnections. The bond pads may comprise aluminum and an aluminum oxide layer on an outer surface. The presence of an aluminum oxide layer may decrease the electrical connection between the wire bond and the aluminum substrate. To remove the aluminum oxide layer, an abrasive tool is provided to ultrasonically abrade the aluminum oxide layer while the conductive print material is being deposited. The conductive print material may include abrasive additives materials to further aid in abrading the aluminum oxide layer.

20 Claims, 6 Drawing Sheets

SYSTEMS AND METHODS FOR ABRASIVE OXIDE REMOVAL IN ADDITIVE MANUFACTURING PROCESSES

STATEMENT OF GOVERNMENTAL SUPPORT

This invention was made with government support under DE-NA0002839 awarded by the United States Department of Energy/National Nuclear Security Administration. The government has certain rights in the invention.

BACKGROUND

1. Field

Embodiments of the invention relate to systems and methods for removing oxide layers. More specifically, embodiments of the invention relate to removing oxide layers on bond pads in an additive manufacturing system using abrasive materials and an abrasive tool therefor.

2. Related Art

Methods for removing oxide layers on substrates are known. For example, U.S. Pat. No. 7,825,026 to Izumi et al. describes removing an oxide layer formed on a substrate by inducing a chemical reaction caused by the decomposition of ammonia gas. U.S. Pat. No. 7,439,501 to King et al. describes removing an oxide layer formed on a substrate during direct write lithography using a heated probe. Methods of manufacturing integrated circuits using additive manufacturing devices are known. For example, U.S. Pat. No. 10,303,840 to Yeric describes using direct write lithography for manufacturing integrated circuits and altering the design of an integrated circuit in response to measured characteristics of the integrated circuit as it is being built.

SUMMARY

Embodiments of the invention solve the above-mentioned problems by providing systems and methods for additive manufacturing and removing an oxide layer on the bonding pad using an ultrasonic, abrasive tool. To aid in abrading the oxide layer, abrasive materials may be added to the print material.

A first embodiment of the invention is directed to a system for oxide removal in additive manufacturing processes, the system comprising an additive manufacturing device for depositing a print material onto a substrate, and an abrasive tool having an abrasive distal end configured to remove an oxide layer formed on the substrate during an additive manufacturing process. The abrasive tool is configured to remove the oxide layer while the print material is deposited onto the substrate.

A second embodiment of the invention is directed to a method of preparing a substrate for an additive manufacturing process, comprising providing a first substrate having an oxide layer thereon, abrading the oxide layer with an abrasive tool to remove the oxide layer, depositing a print material onto the first substrate using an additive manufacturing device during or after abrading the oxide layer, and bonding the print material to the first substrate to form an electrical connection between the first substrate and the print material. The bonding is improved by abrading the oxide layer before or during the depositing of the print material.

A third embodiment of the invention is directed to a system for removing an oxide from a substrate during an additive manufacturing process, the system comprising a substrate having a top surface, an oxide layer on the top surface of the substrate, an additive manufacturing device configured to deposit a conductive print material onto the substrate to form an electrical connection between the substrate and the conductive print material, and an abrasive tool having a distal tip configured to mechanically remove the oxide layer from the substrate to increase an electrical conductivity of the electrical connection.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
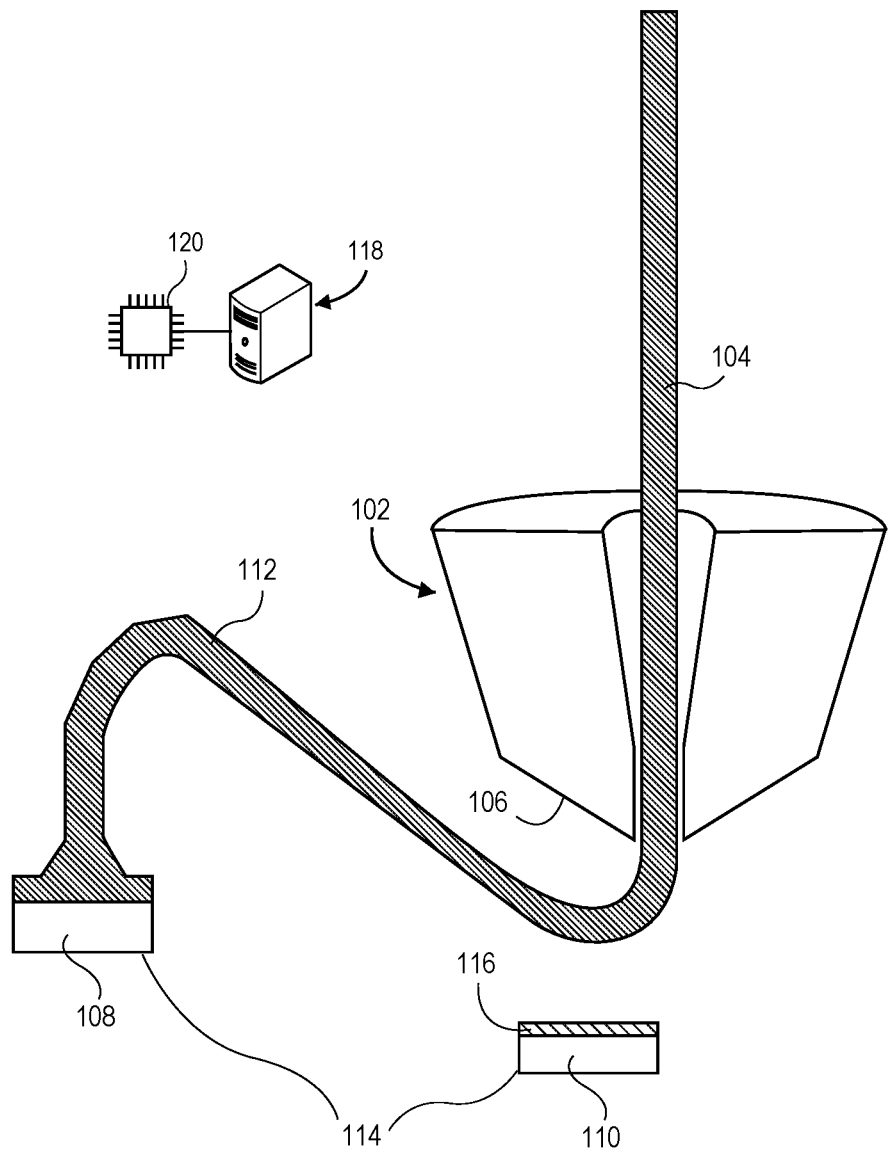
FIG. 1 illustrates an additive manufacturing device manufacturing an interconnect between two bonding pads.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Disclosed embodiments generally relate to effectively interconnecting wire bonds on a semiconductor using an additive manufacturing device while removing an oxide layer that forms on a substrate. In semiconductor devices (e.g., integrated circuits), wire interconnects are often used to electrically connect the semiconductor to its packaging, to other electronics, or from a first semiconductor die to a second semiconductor die. The wires are typically bonded to aluminum bond pads which oxidize in the presence of air, forming aluminum oxide ($Al_2O_3$). Aluminum is often used as a bonding substrate in semiconductors because of its high conductivity and strong adhesion to silicon dioxide, a material often found in semiconductors. However, aluminum oxide (also referred to as alumina or aloxite) is an electrical insulator; as such, the presence of aluminum oxide often leads to a poor electrical connection between the interconnects and the bond pads. Weak bond connections can lead to issues such as non-stick-on-pad and bond lifting in integrated circuits. Thus, it is desirable to remove or substantially reduce the oxide layers from the bond pads in order to make a good electrical connection.

An additive manufacturing device may deposit material (e.g., a conductive material) from one substrate to another substrate to form interconnects between separate components, thus forming an electrical contact between the substrates. Additive manufacturing, also referred to as 3D printing, is a manufacturing technique in which parts are built up layer by layer by depositing a print material onto a substrate. Generally, Computer-Aided Design (CAD) software is used to create a 3D model of a part to be printed. The CAD model is then converted into G-code using Computer-Aided Manufacturing (CAM) software that generates the tool path for the 3D printer to build the part. The tool path is typically generated by the CAM software "slicing" the CAD model into a plurality of horizontal layers and generating coordinate instructions for printing each of the plurality of horizontal layers. One type of additive manufacturing device is a direct ink writing printer. Direct ink writing works by depositing an extruded print material, typically in filament or droplet form, from a nozzle. The print material is then able to retain its shape upon being deposited without needing to be solidified. Direct ink writing allows for a wide variety of print materials, such as conductive inks and pastes, polymers, metals, metal alloys, and ceramics, to be printed. Direct ink writing may be used to print directly on a variety of substrates, including non-planar substrates using conformal printing techniques.

3D printing interconnects provides advantages over using traditional wire bonding machines used to make interconnects. Traditional wire bonds suffer from failure mechanisms such as die cracking, flexing fatigue, and pad delamination which may be partially alleviated by 3D printing interconnects. 3D printers may also be used to print on non-planar surfaces, thus allowing the production of non-planar integrated circuits. Additive manufacturing devices can also print interconnects that are smaller than traditional manufacturing devices. For example, additive manufacturing may be able to print interconnects of approximately 5 microns in diameter while traditional wire bonding machines are limited to producing interconnects having a diameter of approximately 12.5 microns. Additionally, 3D printing machines are capable of printing an entire integrated circuit while traditional wire bonding machines are only capable of printing the interconnects. Thus, a method for additively manufacturing interconnects for integrated circuits may substantially increase the rate at which circuits can be prototyped and tested. However, conductive inks printed by additive manufacturing devices to create the interconnects are often unable to break through the oxide layer on the surface. As such, what is needed is a system and method for interconnecting wire bonds using an additive manufacturing device while removing or substantially reducing any oxide layer to promote a good electrical contact between the bonding pads and the wires.

As described above, substrates for the wire interconnects are typically aluminum bond pads that oxidize when exposed to air forming a layer of aluminum oxide. The aluminum oxide may cause a bond having a high electrical resistance to form between the bond pads and the conductive wire, thus rendering the semiconductor unacceptable for use due to poor electrical conductivity. In some embodiments, an abrasive tool comprising an abrasive material is used to abrade and mechanically scrub the aluminum oxide layer. In some embodiments, the abrasive tool may operate ultrasonically (i.e., at frequencies greater than 20 kHz). In some embodiments, the abrasive tool is attached to a nozzle of the additive manufacturing device or integrated within the nozzle itself. The conductive print material may comprise additives or dopants comprising one or more abrasive materials to aid in abrading the oxide layer.

FIG. 1 illustrates embodiments of a system using an additive manufacturing device 102 to create interconnects in a semiconductor or integrated circuit. Generally, additive manufacturing device 102 may be any additive manufacturing device capable of depositing a material that forms the wire bonds at the requisite dimensions and conductivity. For example, additive manufacturing device 102 may be any of a Vat polymerization, binder jetting, powder bed fusion, sheet lamination, or a directed energy deposition device. In some embodiments, additive manufacturing device 102 is a direct write machine.

As illustrated in FIG. 1, additive manufacturing device 102 deposits print material 104 via nozzle 106. Print material 104 may be any conductive material that can be dispensed out of nozzle 106. For example, print material 104 may comprise carbon, cobalt, ruthenium, graphite, graphene, gold, gold epoxy, copper, silver, silver epoxy, platinum, nickel, tin, tungsten, zinc, single or multi wall carbon nanotubes, poly(3,4-ethylenedioxythiophrene) polystyrene sulfonate (PEDOT:PSS), or any combination thereof. In some embodiments, the conductive print material 104 is in the form of an ink or a paste. Broadly, any material that can be printed by additive manufacturing device 102 and has the requisite conductivity for the semiconductor being produced may be used as print material 104. In some embodiments, the conductivity of print material 104 is in the range of about $3.3 \cdot 10^2$ S/m to about $6.5 \cdot 10^7$ S/m. In some embodiments, print material 104 helps abrade the oxide layer or completely abrades the oxide layer. Additionally, in some embodiments, print material 104 may comprise an abrasive additive comprising a substantially hard material such as tungsten, silver, gold, diamond, aluminum, copper, titanium, or a combination thereof to increase the hardness of print material 104 to aid in breaking the oxide layer. By increasing the hardness of print material 104, print material 104 may be able to partially abrade the oxide layer. In some embodiments, the particle size of additive materials added to print material 104 is less than about 1 micron to about 5 microns. Some abrasive materials may also provide enhanced conductivity to print material 104. For example, if print material 104 comprises carbon, doping the carbon with tungsten may both increase the abrasion and increase the conductivity of print material 104. Broadly, any additive material having a hardness greater than about 9 on Mohs hardness scale may aid in abrading the oxide layer. In some embodiments, the abrasive additive is added such that the final composition comprises about 2% to less than about 10% by weight of print material 104.

Semiconductors typically comprise at least two bond pads for bonding wires when creating interconnects. Wires are often bonded from one pad to the next pad until each bond pad is connected to a wire. In some embodiments, additive manufacturing device 102 creates about six interconnects per second. As depicted in FIG. 1, additive manufacturing device 102 has made a connection on first bond pad 108 and is in the process of making the next connection to second bond pad 110, thus forming wire 112, which comprises print material 104. First bond pad 108 and second bond pad 110 (collectively referred to hereinafter as bond pads 114) may be about 25 microns in diameter to about 75 microns in diameter. In some embodiments, bond pads 114 may have a width and/or length of about 25 microns to about 75 microns. In some embodiments, bond pads 114 comprise aluminum or an aluminum alloy. For example, bond pads 114 may comprise an aluminum-silicon alloy comprising about 0.5% Si to about 2% Si. As another example, bond pads 114 may comprise an aluminum-silicon-copper alloy. However, aluminum oxidizes when exposed to atmosphere, thus forming an oxide layer 116 on at least a top surface of bond pads 114. In some embodiments, oxide layer 116 is less than 1 nm to about 10 nm thick. In some embodiments, an aluminum alloy may be used to reduce the oxidation of bond pads 114 when exposed to atmosphere, thus reducing the thickness of oxide layer 116. For example, aluminum 5052, an aluminum alloy that is primarily alloyed with manganese and copper, may be used for bond pads 114 and oxidizes less than a pure or near-pure aluminum substrate. As described above, the presence of oxide layer 116 weakens the bond formed between wire 112 and bond pads 114, thereby decreasing the performance of the integrated circuit. Therefore, removing or substantially reducing the thickness of oxide layer 116 may allow for an acceptable electrical contact to be made between wire 112 and bond pads 114. In some embodiments, bond pads 114 may comprise materials such as gold, nickel, copper, or alloys thereof. For example, integrated chips used in radio frequency applications often use bond pads 114 comprising gold.

In some embodiments, additive manufacturing device 102 may be controlled by executing computer-executable instructions. The computer-executable instructions may be stored on computer 118 associated with and communicatively coupled to additive manufacturing device 102 in some embodiments. Computer 118 may comprise one or more non-transitory computer-readable media storing computer-executable instructions that, when executed by at least one processor (such as within controller 120), control the printing of additive manufacturing device 102. Computer 118 may be a desktop computer, a laptop, a mobile phone, a tablet, or a virtual machine. Controller 120 may comprise at least one controller, a transmitter, a receiver, a server, a processor, a memory, and any components necessary for electrically communicating information between components and connecting to a local network and the Internet via a wired or wireless communication medium.

Figure 2A:
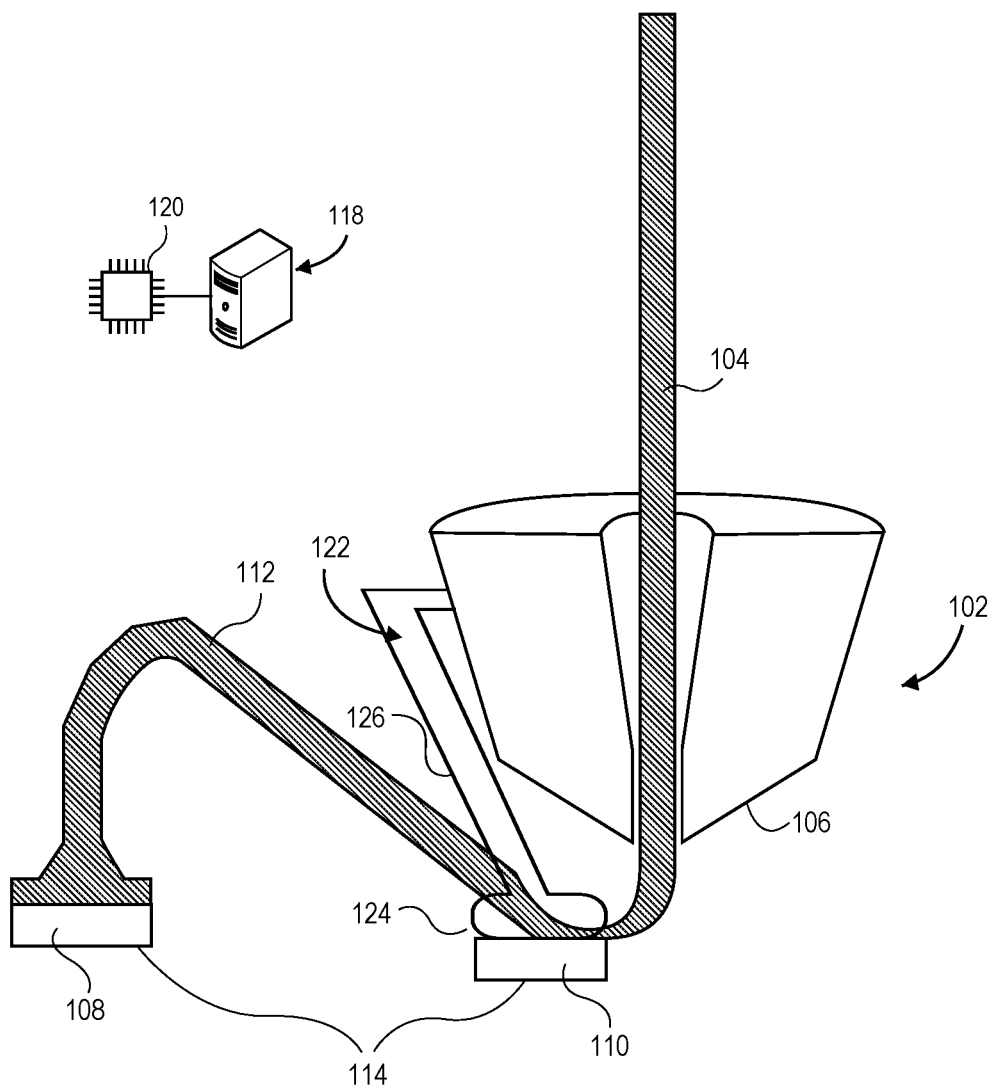
FIG. 2A illustrates an additive manufacturing device having an abrasive tool in a first position to abrade an oxide layer.
Figure 2B:
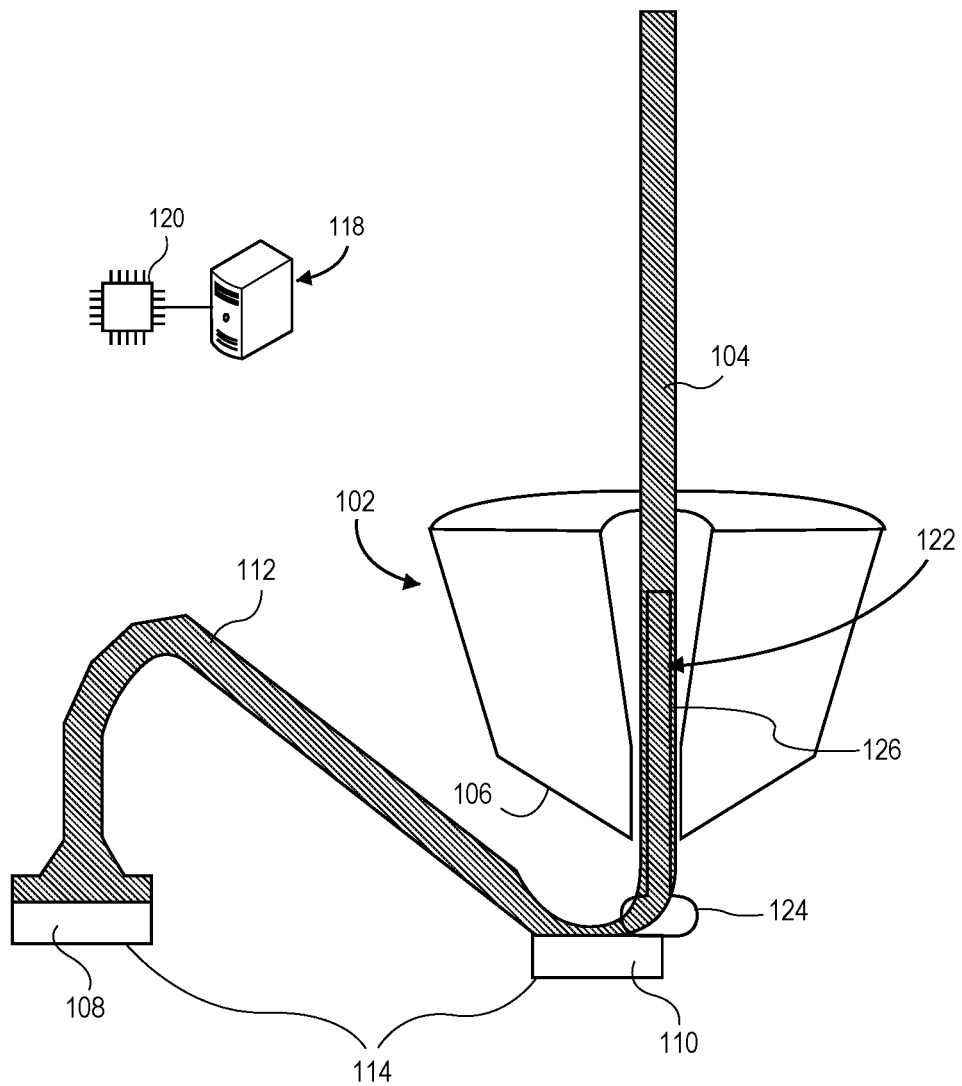
FIG. 2B illustrates the additive manufacturing device having the abrasive tool in a second position to abrade the oxide layer.
Figure 2C:
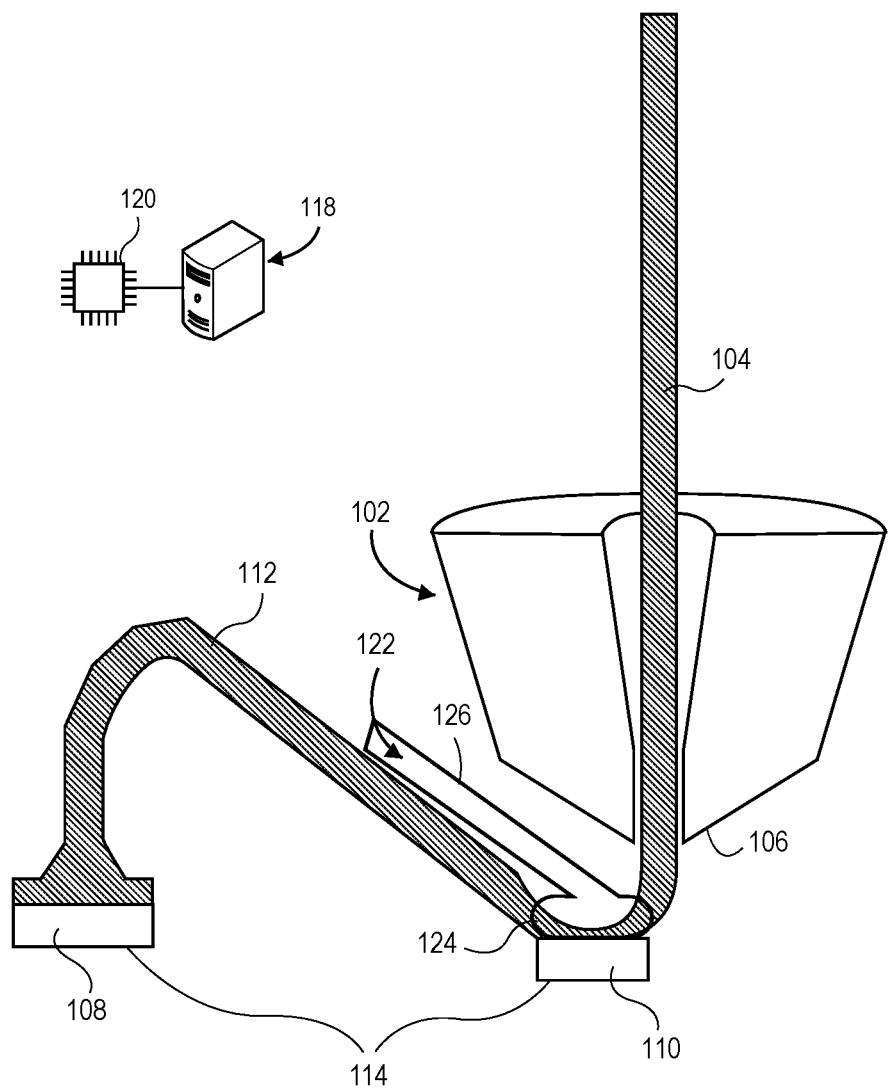
FIG. 2C illustrates the abrasive tool operating independently from the additive manufacturing device to abrade the oxide layer.

As illustrated in FIGS. 2A-2C, to remove oxide layer 116, an abrasive tool 122 may be used in conjunction with additive manufacturing device 102. Abrasive tool 122 may be a probe or a scrubber tool having an abrasive tip 124 that directly contacts oxide layer 116 to mechanically remove at least a portion of oxide layer 116. As described above, abrasive tool 122 may be configured to operate ultrasonically to abrade oxide layer 116. In some embodiments, abrasive tool 122 operates at a frequency in the range of about 20 kHz to about 160 kHz. In some embodiments, a higher frequency may be used to more efficiently abrade oxide layer 116 compared with a lower frequency. Operating at a higher frequency may allow for oxide layer 116 to be removed more quickly due to the higher intensity caused by the increased frequency. The ultrasonic energy provided by abrasive tool 122 may work to scrub the wire 112 bond against bond pads 114, thus removing oxide layer 116. The ultrasonic energy may further serve to bond wire 112 to bond pads 114 by plastically deforming wire 112 against bond pads 114. The ultrasonic abrasion provided by abrasive tool 122 may mechanically scrub oxide layer 116 off bond pads 114 without requiring heat above room temperature. Because additive manufacturing processes are often conducted at room temperature, it may prove advantageous to remove oxide layer 116 without substantially heating bond pads 114.

As shown in FIG. 2A, in some embodiments, abrasive tool 122 may be attached to nozzle 106 of additive manufacturing device 102. In other embodiments, abrasive tool 122 may be separately provided near or adjacent to nozzle 106. Abrasive tool 122 may be attached via various attaching means, such as by a clamp or a mechanical fastener. Abrasive tool 122 may be positioned such that abrasive tip 124 is below nozzle 106 and contacts at least the top surface of bond pads 114. In some embodiments, for example, when printing on a non-planar substrate, abrasive tool 122 may be configured to move to the appropriate positions as additive manufacturing device 102 prints on a contoured surface. In some embodiments, abrasive tool 122 may include a hinge or retractable arm for moving the abrasive tip 124 to the appropriate location. As additive manufacturing device 102 prints wires 112, abrasive tool 122 may simultaneously abrade oxide layer 116 by applying ultrasonic force to oxide layer 116 and/or bond pads 114, thus allowing a good electrical connection to be formed. The simultaneous abrasion of oxide layer 116 and deposition of print material 104 may prevent or substantially limit reoxidation of oxide layer 116. In some embodiments, the ultrasonic abrasion of oxide layer 116 occurs following the bonding of wire 112 to bond pads 114. In some such embodiments, the delay between printing wire 112 and abrading oxide layer 116 may be about 0.5 s to about 1 s. In some embodiments, the ultrasonic abrasion of oxide layer 116 occurs before bonding wire 112 to bond pads 114. However, abrading oxide layer 116 prior to bonding may allow for a partial reformation of oxide layer before wire 112 is bonded to bond pads 114. In some embodiments, oxide layer 116 is abraded both prior to deposition of print material 104 and simultaneously to deposition of print material 104. Similarly, in some embodiments, oxide layer 116 is abraded both simultaneously to deposition of print material 104 and after deposition of print material 104. Generally, any combination of abrading prior to, during, and after deposition of print material 104 may be used herein to effectively bond wire 112 to bond pads 114 and allow a good electrical connection to be made. In embodiments where abrading is performed after the deposition of print material 104, the abrading may be done before the print material 104 has cured completely.

In some embodiments, abrasive tip 124 may have a substantially blunt distal end such that abrasive tip 124 avoids damaging bond pads 114 or wire 112 when abrading oxide layer 116. In some embodiments, abrasive tip 124 comprises a blunt, round, conical, or substantially spherical shape. In some embodiments, abrasive tip 124 is about 25 microns to about 70 microns wide. As illustrated in FIGS. 2A and 2C, in some embodiments, the size of abrasive tip 124 may be substantially similar to the size of the bonding pads such that abrasive tip 124 only needs to touch down on top surface bond pad 114 and does not need to move to cover the entire top surface of bond pad 114. As illustrated in FIG. 2B, in some embodiments, the size of abrasive tool 122 may be smaller than that of bond pads 114 and abrasive tool 122 may move and/or perform a scrubbing motion on bond pads 114 to effectively abrade oxide layer 116. To effectively abrade oxide layer 116, abrasive tip 124 may comprise a bottom surface having an abrasive material thereon. In some embodiments, the abrasive material comprises tungsten, tungsten carbide, tungsten alloy, copper, silver, diamond, carbonado, corundum, carborundum, alumina, aluminum boride, boron carbide, titanium diboride, moissanite, titanium or any mixture thereof. Abrasive tip 124 may be completely formed from the abrasive material or the abrasive material may be coated or otherwise applied onto an outer surface of abrasive tip 124. For example, abrasive tip 124 may be titanium, steel, aluminum, or another metal and may be coated with tungsten. The abrasive material should be selected such that the material does not contaminate wire 112 or bond pads 114 during abrasion. Abrasive tool 122 also comprises tool body 126 which may connect abrasive tip 124 to additive manufacturing device 102.

As shown in the embodiment illustrated in FIG. 2B, abrasive tool 122 may be housed within the lumen of nozzle 106 or otherwise integrated nozzle 106 of additive manufacturing device 102. The abrasive tool 122 and the lumen of nozzle 106 are appropriately sized in the FIG. 2B embodiment such that print material 104 is able to flow around abrasive tool 122 to reach the bond pads 114. In some embodiments, abrasive tool 122 may operate continuously while additive manufacturing device 102 deposits print material 104. In some embodiments, abrasive tool 122 is programmed to selectively retract when bonds are being made onto first bond pad 108 or second bond bad 108. Thus, in such an embodiment, abrasive tool 122 may avoid interfering with wire 112 as wire 112 is deposited from first bond pad 108 to second bond pad 110. Once print material 104 is deposited, abrasive tool 122 may then extend to abrade oxide layer 116. Alternatively, abrasive tool 122 may continuously operate as additive manufacturing device 102 deposits print material 104. In some embodiments, abrasive tool 122 retracts when additive manufacturing device 102 is not depositing print material 104. Print material 104 may then flow around abrasive tool 122 as print material 104 is deposited.

To prevent build-up of print material 104 on abrasive tip 124 over time, additive manufacturing device 102 may be programmed to selectively clean abrasive tip 124. For example, after making a predetermined number of wires 112, or after a predetermined amount of time, additive manufacturing device 102 may be configured to place abrasive tool 122 into a cleaning solution or otherwise remove any built up print material 104 or other contaminants.

In some embodiments, nozzle 106 may itself serve as abrasive tool 122 or may be used in addition to abrasive tool 122. For example, nozzle 106 may include a coating of abrasive material and may abrade oxide layer 116 as additive manufacturing device 102 deposits wires 112. In some embodiments, nozzle 106 may include a coating comprising tungsten or silver. In such an embodiment, the tool path for additive manufacturing device 102 may be configured for nozzle 106 to print near the surface of bond pads 114 such that nozzle 106 can contact and abrade oxide layer 116 while printing. Additive manufacturing device 102 may also be configured to operate in the ultrasonic frequency range to allow nozzle 106 to abrade oxide layer 116.

As illustrated in FIG. 2C, in some embodiments, abrasive tool 122 may be disposed separately and operate independently from additive manufacturing device 102. For example, abrasive tool 122 may instead be mounted on a separate apparatus (not shown) and abrade oxide layer 116. In some embodiments, abrasive tool 122 may be controlled robotically and configured to abrade oxide layer 116 as additive manufacturing device 102 creates wires 112. Similar to the embodiments described with respect to FIGS. 2A and 2B, in embodiments where abrasive tool 122 is not attached to additive manufacturing device 102, abrasive tool 122 may be configured to abrade prior to bonding wire 112 to second bond pad 110, simultaneous to bonding wire 112 to second bond pad 110, subsequently to bonding wire 112 to second bond pad 110, or any combination thereof.

In some embodiments, abrasive tool 122 may be communicatively coupled to computer 118 and may be controlled programmatically, via controller 120, by executing non-transitory computer-executable instructions, to operate in conjunction with the deposition of print material 104 by additive manufacturing device 102. In some embodiments, controller 120 may be configured to control abrasive tool 122 separately from additive manufacturing device 102. In some embodiments, a separate controller 120 controls each of additive manufacturing device 102 and abrasive tool 122. Abrasive tool 122 may be powered via one or more motors to move abrasive tool 122 to the appropriate positions and abrade oxide layer 116. In some embodiments, abrasive tool 122 may be controlled via stepper and/or servomotors. Additional motion controlling components, such as servos, encoders, amplifiers, or feedback sensors, may be used along with the motors to power abrasive tool 122 and control the movement of abrasive tool 122.

As briefly described above, print material 104 may be doped with various materials that may additionally abrade oxide layer 116. In some embodiments, print material 104 is doped with one of tungsten, a tungsten alloy, copper, and/or silver. Broadly, the abrasive additive should be selected such that the abrasive material can at least partially abrade oxide layer 116 without substantially reducing the conductivity of print material 104. Doping print material 104 with an abrasive material may eliminate the need for abrasive tool 122. In some embodiments, if an abrasive material is added to print material 104, the frequency at which abrasive tool 122 operates may be lowered, thus saving power. Using silver or a silver epoxy as print material 104 may provide a material that has both the requisite conductivity for functioning as an interconnect and the requisite hardness to substantially abrade oxide layer 116 without requiring abrasive tool 122. In some embodiments, print material 104 and the abrasive additive are mixed within additive manufacturing device 102. In other embodiments, print material 104 and abrasive additive are mixed prior to insertion into additive manufacturing device.

Figure 3:
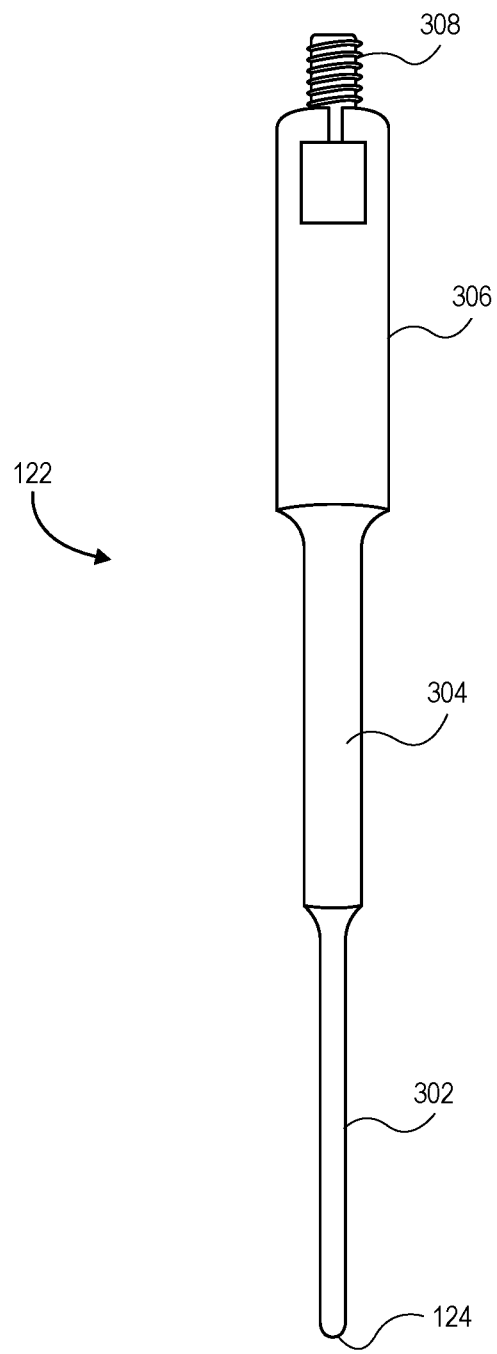
FIG. 3 illustrates the abrasive tool for certain embodiments.

FIG. 3 illustrates abrasive tool 122 for certain embodiments. As shown, abrasive tool 122 comprises abrasive tip 124, lower body 302, central body 304, and upper body 306. In some embodiments, lower body 302 has a smaller circumferential dimension than central body 304. In some embodiments, Central body 304 has a smaller circumferential dimension than upper body 306. In some embodiments, each of lower body 302, central body 304, and upper body 306 have substantially the same circumferential dimensions. In some embodiments, tool body 126 may be substantially cylindrical, rectangular, or pentagonal or any other geometrical shape. In some embodiments, abrasive tool 122 may be substantially similar to a sonicator. Abrasive tool 122 may be connected to a converter (not shown) via connecting piece 308. The converter may in turn be connected to a generator to provide power to abrasive tool 122. In some embodiments, the generator provides high voltage pulses at ultrasonic frequency (i.e., greater than 20 kHz) that drives the converter. In some embodiments, the converter is a piezoelectric transducer that converts the voltage from the generator into vibrations at ultrasonic frequency using piezoelectric crystals. The converter, in turn, transmits the amplified vibration into abrasive tool 122, thus allowing abrasive tool 122 to ultrasonically abrade oxide layer 116.

Abrasive tool 122 may be controlled, manually or automatically, to abrade oxide layer 116. As described above, additive manufacturing device 102 may be programmed to follow a tool path generated from a CAM model. Thus, in some embodiments, for example, when abrasive tool 122 is integrated within nozzle 106, abrasive tool follows the generated tool path. Abrasive tip 124 may be disposed a distance outside of nozzle 106 such that abrasive tip 124 contacts bond pads 114 while print material 104 is printing. In some embodiments, abrasive tool 122 is configured to extend and retract abrasive tip 124 when bonding is occurring. When abrasive tool 122 is attached to an outer surface of nozzle 106, abrasive tool 122 may be positioned such that abrasive tip 124 contacts the top surface of bond pads 114 as additive manufacturing device 102 prints the various interconnects. Alternatively, or additionally, abrasive tip 124 is positioned to be beneath nozzle 106 (with abrasive tool 122 on the outer surface of nozzle 106) and print material 104 flows around abrasive tip 124. Such an embodiment may allow for the ultrasonic force to be applied efficiently while not having to extend and retract abrasive tip 124 or dispose abrasive tool 122 within nozzle 106.

Figure 4:
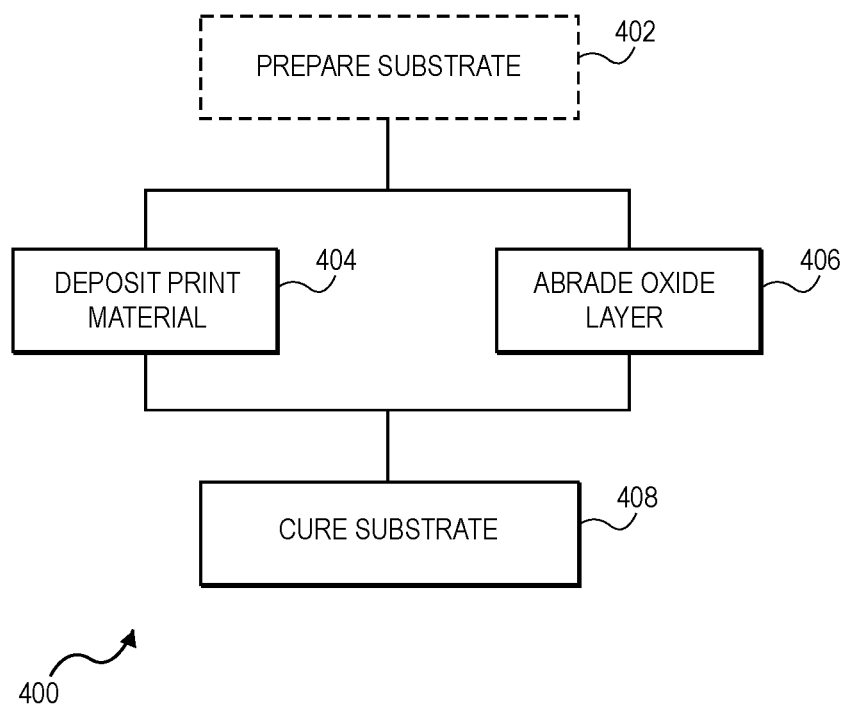
FIG. 4 illustrates an exemplary method for abrasively removing oxide layers during the additive manufacturing of interconnects.

FIG. 4 illustrates an exemplary method 400 for removing oxide layer 116 during an additive manufacturing process. At optional step 402, the bond pads 114 may undergo various preprocessing or preparation steps to optimize bond pads 114 for bonding. In some embodiments, bond pads 114 are cleaned to remove any contaminants that may be present, such as oxide layer 116, or any organic or fluoride contaminants. Cleaning prior to printing may further increase the bond strength of wire 112 to bond pads 114. Example cleaning methods include plasma and UV cleaning. Plasma cleaning may utilize hydrogen gas, argon gas, helium gas, oxygen gas, nitrogen gas, carbon tetrafluoride ($CF_4$) forming gas, or any sequence or combination thereof. If bond pads 114 comprise gold as the substrate material, oxygen gas may be used for plasma cleaning. In some embodiments, UV cleaning methods are performed, such as Ultraviolet-Ozone (UV-$O_3$) surface treatment. Similar to plasma cleaning, UV-$O_3$ surface treatment may at least partially remove oxide layer 116 and other contaminants that may be present on bond pads 114. Cleaning the bond pads 114 may serve to reduce any initial formation of oxide layer 116. Between the cleaning and the deposition of print material 104, oxide layer 116 may reform, but the reformed oxide layer 116 may be thinner than it was prior to cleaning. In some embodiments, a solvent cleaning process (e.g., cleaning bond pads 114 with acetone) may be undertaken prior to, in place of, or after plasma or UV cleaning.

Once bond pads 114 are prepared, step 404 and/or step 406 may be performed. At step 404, the print material may be deposited onto bond pads 114 to form wire 112. At step 406, abrasive tool 122 abrades oxide layer 116. In some embodiments, and as shown in FIG. 3, step 404 and step 406 occur simultaneously or nearly simultaneously. However, in some embodiments, step 404 occurs prior to step 406, or step 406 may occur prior to step 404, or both. As described above, additive manufacturing device 102 and/or abrasive tool 122 may be controlled by controller 120 and/or computer 118. Communication between computer 118 and additive manufacturing device 102 and abrasive tool 122 may be wired or wirelessly.

As described above, at step 404, print material 104 may be deposited on bond pads 114. Print material 104 may be any conductive material as previously described. For example, print material 104 may be carbon, cobalt, ruthenium, graphite, graphene, gold, gold epoxy, copper, silver, silver epoxy, platinum, nickel, tin, tungsten, zinc, single or multi wall carbon nanotubes, PEDOT:PSS, or any combination thereof. Prior to printing, print material 104 may be doped with an abrasive material to increase the hardness of print material 104. Having a substantially hard material may allow for print material 104 to break oxide layer 116 without the need for abrasive tool 122. In some embodiments, print material 104 comprises silver or silver epoxy, which may have a hardness sufficient to break through oxide layer 116 without the use of abrasive tool 122. Once deposited, print material 104 may then bond to bond pads 114 to form one end of wire 112 for the interconnects.

At step 406, abrasive tool 122 may be applied to oxide layer 116. As described above, oxide layer 116 may be present prior to depositing print material 104 due to the exposure of bond pads 114 to the atmosphere. As such, simultaneous (or near-simultaneous) abrasion of oxide layer 116 with abrasive tool 122 may allow for a better initial bond of print material 104 to bond pads 114. In some embodiments, oxide layer 116 is abraded after print material 104 is deposited. In some embodiments, oxide layer 116 is abraded prior to the deposition of print material 104; however, abrading prior to depositing may result in the reformation of oxide layer 116 before a sufficient bond can be made. In some embodiments, step 406 may be omitted. For example, if print material 104 comprises a sufficiently hard material to abrade oxide layer 116, there may be no need to utilize abrasive tool 122 because print material 104 may completely abrade oxide layer 116. Once print material 104 has been deposited and abrasive tool 122 has removed oxide layer 116, the presence of print material 104 on bond pads may prevent substantial reformation of oxide layer 116.

As described above, abrasive tool 122 may be attached to the side of nozzle 106, attached to another surface on additive manufacturing device 102, or may be integrated within nozzle 106. In some embodiments, abrasive tool 122 is disposed on or attached to a separate structure that controls abrasive tool 122 separately from additive manufacturing device 102, but abrasive tool 122 is still configured to work in conjunction with additive manufacturing device 102.

Once all bonds on the substrate, such as an integrated chip, have been made, processing may proceed to step 408 where the substrate is cured. Curing the semiconductor may further strengthen the bonds between bond pads 114 and wires 112. In some embodiments, the curing is performed in an oven. The oven curing temperature may range from about 100° C. to about 150° C. In some embodiments, the wires 112 and bonds are UV cured. Broadly, the curing parameters may be determined based in part on the selected print material 104.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A system for oxide removal in additive manufacturing processes, the system comprising:
    an additive manufacturing device comprising a nozzle for depositing a print material onto a substrate; and
    an abrasive tool having an abrasive distal end configured to remove an oxide layer formed on the substrate during an additive manufacturing process,
    wherein the abrasive tool is coupled to the nozzle, and
    wherein the abrasive tool is configured to remove the oxide layer while the print material is deposited onto the substrate.

2. The system of claim 1, further comprising a controller, wherein the controller is configured to operate the abrasive tool independently from the nozzle of the additive manufacturing device.

3. The system of claim 1, further comprising a controller, wherein the nozzle comprises an outer surface,
    wherein the abrasive tool is coupled to the outer surface of the nozzle, and
    wherein the controller is configured to operate the abrasive tool ultrasonically to remove the oxide layer from the substrate.

4. The system of claim 1, wherein the abrasive distal end comprises a round tip having a diameter of about 25 microns to about 70 microns.

5. The system of claim 1, wherein the abrasive distal end comprises at least one of tungsten, a tungsten alloy, or silver.

6. The system of claim 1, further comprising the print material, wherein the print material comprises one of carbon, silver, copper, or gold.

7. The system of claim 6, wherein the print material further comprises an abrasive additive to increase a hardness of the print material.

8. The system of claim 1,
    wherein the substrate comprises aluminum or an aluminum alloy, and
    wherein the oxide layer comprises an aluminum oxide layer formed when the substrate is exposed to atmosphere.

9. A method of preparing a substrate for an additive manufacturing process, comprising:
    providing a substrate having an oxide layer thereon;
    abrading the oxide layer with an abrasive tool to remove the oxide layer,
    wherein the abrasive tool is coupled to a nozzle of an additive manufacturing device;
    depositing a print material onto the substrate using the additive manufacturing device before, during, or after abrading the oxide layer; and
    bonding the print material to the substrate to form an electrical connection between the substrate and the print material.

10. The method of claim 9, further comprising abrading the oxide layer simultaneously with depositing the print material.

11. The method of claim 9, further comprising:
    ultrasonically vibrating a distal tip of the abrasive tool to mechanically abrade the oxide layer.

12. The method of claim 9, further comprising abrading the oxide layer before depositing the print material.

13. The method of claim 9, further comprising:
    adding an abrasive material to the print material before depositing the print material,
    wherein the abrasive material does not substantially reduce a conductivity of the print material.

14. The method of claim 9, wherein the substrate is a first substrate, the method further comprising:
    depositing the print material onto a second substrate to form an interconnect between the first substrate and the second substrate.

15. A system for removing an oxide from substrates during additive manufacturing processes, the system comprising:
    a substrate having a top surface, the top surface having an oxide layer;
    an additive manufacturing printer configured to deposit a conductive print material onto the substrate to form an electrical connection between the substrate and the conductive print material; and
    an abrasive tool having a distal tip configured to mechanically remove the oxide layer from the substrate to increase an electrical conductivity of the electrical connection,
    wherein the distal tip is positioned beneath a nozzle of the additive manufacturing printer during printing such that the conductive print material flows around the distal tip.

16. The system of claim 15, wherein the abrasive tool is housed within the nozzle of the additive manufacturing printer.

17. The system of claim 16, wherein the nozzle comprises a coating on a distal end, said coating comprising tungsten, a tungsten alloy, or silver to abrade the oxide layer.

18. The system of claim 15,
    wherein the conductive print material comprises tungsten to increase a hardness of the conductive print material, and
    wherein the tungsten comprises about 2% weight to about 10% weight of the conductive print material.

19. The system of claim 15, wherein the substrate comprises an aluminum bond pad of a semiconductor device.

20. The system of claim 15, wherein the distal tip is an ultrasonic tip configured to mechanically abrade the oxide layer.

* * * * *